United States Patent
Antreasyan et al.

(10) Patent No.: US 10,605,581 B2
(45) Date of Patent: Mar. 31, 2020

(54) ARTICULATING PROBE HEAD FOR MEASURING SYSTEM

(71) Applicant: TESA SA, Renens (CH)

(72) Inventors: Dikran Antreasyan, Meyrin (CH); Laurent Demierre, Eysins (CH)

(73) Assignee: TESA SA, Renens (CH)

( * ) Notice: Subject to any disclaimer, the term of this patent is extended or adjusted under 35 U.S.C. 154(b) by 218 days.

(21) Appl. No.: 15/357,916

(22) Filed: Nov. 21, 2016

(65) Prior Publication Data

US 2017/0167843 A1    Jun. 15, 2017

(30) Foreign Application Priority Data

Dec. 11, 2015  (EP) .................................... 15199613

(51) Int. Cl.
| | |
|---|---|
| *G01B 5/008* | (2006.01) |
| *G01B 5/00* | (2006.01) |
| *G01B 11/00* | (2006.01) |
| *G01B 5/012* | (2006.01) |

(52) U.S. Cl.
CPC ........... *G01B 5/008* (2013.01); *G01B 5/0014* (2013.01); *G01B 5/012* (2013.01); *G01B 11/007* (2013.01)

(58) Field of Classification Search
CPC .... G01B 5/012; G01B 11/007; G01B 5/0014; G01B 5/008; G01B 7/012
USPC ......................................................... 33/503
See application file for complete search history.

(56) References Cited

U.S. PATENT DOCUMENTS

| | | | |
|---|---|---|---|
| 5,623,766 A * | 4/1997 | Ruck ..................... | F16F 15/035 33/559 |
| 7,213,345 B2 | 5/2007 | Jordil et al. | |
| 7,395,606 B2 * | 7/2008 | Crampton .............. | B25J 13/088 33/503 |
| 7,591,078 B2 * | 9/2009 | Crampton .............. | B25J 13/088 33/503 |
| 7,861,430 B2 | 1/2011 | Jonas et al. | |
| 8,474,148 B2 | 7/2013 | Jonas et al. | |
| 8,919,005 B2 * | 12/2014 | Mamour ................ | G01B 5/012 33/503 |
| 9,494,413 B2 * | 11/2016 | Vuilloud .............. | G01B 11/005 |
| 9,803,966 B2 * | 10/2017 | Pettersson ............. | G01B 21/04 |
| 2004/0184039 A1 | 9/2004 | Christoph | |
| 2005/0166413 A1 * | 8/2005 | Crampton .............. | B25J 13/088 33/503 |
| 2008/0024793 A1 * | 1/2008 | Gladnick ............. | G01B 11/007 356/603 |

(Continued)

FOREIGN PATENT DOCUMENTS

| | | |
|---|---|---|
| DE | 4436782 A1 | 4/1995 |
| EP | 0 690 286 A1 | 1/1996 |

(Continued)

OTHER PUBLICATIONS

European Search Report dated Nov. 3, 2016 as received in Application No. 15199613.9.

*Primary Examiner* — Yaritza Guadalupe-McCall
(74) *Attorney, Agent, or Firm* — Maschoff Brennan (57) ABSTRACT

An articulating probe head for a measuring system comprising cooling elements. The cooling elements are modulated in response to the temperature of or the power dissipated in the probe head such that its temperature remains stable during operation.

13 Claims, 3 Drawing Sheets

(56) References Cited

U.S. PATENT DOCUMENTS

| | | | | |
|---|---|---|---|---|
| 2008/0235970 A1* | 10/2008 | Crampton | ............. | B25J 13/088 33/503 |
| 2013/0181387 A1* | 7/2013 | Stumpp | ................... | B23Q 1/38 269/71 |
| 2014/0007441 A1* | 1/2014 | Pettersson | ............. | G01B 5/008 33/503 |
| 2017/0167843 A1* | 6/2017 | Antreasyan | ............ | G01B 5/008 |

FOREIGN PATENT DOCUMENTS

| | | |
|---|---|---|
| EP | 0 693 669 A2 | 1/1996 |
| EP | 1407219 B1 | 5/2006 |
| EP | 1 672 309 A1 | 6/2006 |
| EP | 2 881 705 A1 | 6/2015 |
| EP | 2 977 715 A1 | 1/2016 |

* cited by examiner

ARTICULATING PROBE HEAD FOR MEASURING SYSTEM

FIELD OF THE INVENTION

The present invention concerns, in embodiment, the field of coordinate measurements and, in particular, an articulating probe head to which a measuring probe can be attached for measuring a workpiece on a coordinate measuring machine (CMM). Importantly the probe head includes cooling elements designed to maintain the probe at a stable temperature.

DESCRIPTION OF RELATED ART

Articulating probe heads, in particular motorized probe heads, are known and have been described for example in EP1672309. Articulating probe heads are attached to the moving arm of a CMM to orient the angular position of the measurement probe with respect to the moving arm. Various types of measurement probes can be attached to the probe head in an exchangeable way, preferably in automatic fashion, to allow different types of measurements to be performed on the work piece. The measurement probe can be of contact or non-contact type to measure the three-dimensional coordinates of a work piece. Other types of measurement probes can also be used, for example to image or to sense the surface of the work piece using tactile, optical, inductive, capacitive or magnetic means. The articulating probe head incorporates at least one, preferably two axes of rotation which orient the measurement probe with respect to the moving arm of the CMM. The probe head can include additional degrees of freedom, for example a third axis of rotation where the measurement probe rotates on its own longitudinal axis. For simpler realizations, such as a probe head with a single axis of rotation, the term probe holder is also used.

In the context of the present invention, Articulating does not imply motorized—an articulating probe could be manually moveable and inclinable.

Articulating probe heads comprising one or more drive motors are prone to heating during their operation due to the heat generated by the actuators, the encoders and electronics contained in the head. The power consumed by the probe head can be several Watts and is higher in models which use embedded micro-processors. As a result, the temperature of the probe head can increase by a few ° C. which, in turn, causes a dilatation of the probe head whose body is typically made of steel. The resulting length variations can amount to several microns and introduce an error of similar magnitude in the measurement of the work piece. The probe head and measuring probe must therefore be calibrated to correct for these length variations. In addition, the temperature of the probe head may fluctuate as a result of the intermittent operation of the motors, requiring additional calibrations.

Several solutions have been proposed to stabilize the temperature of a probe head during operation. For example, U.S. Pat. Nos. 7,861,430 and 8,474,148 describe an articulating probe head that comprises a temperature sensor, a temperature controller and heating elements. EP0690286 describes an articulating probe head comprising heating elements which are activated whenever the actuators are at rest. A more general system is described in EP1407219 where the CMM is equipped with heating elements to stabilize the temperature of the work piece and the measuring machine. All of these systems rely on additional heating to stabilize the temperature and therefore require a warm up time before accurate measurements can be made. Moreover, part of the heat supplied to stabilize the temperature will be dissipated in the CMM and will modify its temperature, in particular of the arm to which the probe head is attached.

An alternative to the heating the probe head has been proposed in DE4436782 with the work piece being placed in a constant temperature bath. Such an arrangement, however, is not practical to implement.

The measuring probe, which is attached to the probe head, is also prone to heating if it includes electronic or optical systems for sensing. To avoid temperature variation of such probes, especially at the start of operation, the probes are generally pre-heated before installation on the probe head. Alternatively, cooling elements have been suggested to control the temperature. For example EP0693669 describes a scanning touch probe with 3 independent motion axes, x, y, z which are equipped with solenoids for selectively clamping or releasing each motion axis. The heat generated by the solenoids is evacuated by a liquid coolant loop and radiated by means of a heat exchanger on the outer part of the probe. This device allows passive translation of the sensing pin, but lacks the capability of orienting the probe in space. U.S. Pat. No. 8,919,005 describes a scanning contact probe with a temperature actuator that can either heat or cool the probe according to the desired temperature. The present invention can also address the probe heating in an economical way, by cooling the probe through a heat conductive attachment between the probe and the probe head as will be described below.

It is likewise known in the art to install temperature transducers and temperature probes in articulating probe heads for CMM. The articulating heads produced by the applicant and designated by the product names "Tesastar-m" and "Hexagon HH-A 5" include a temperature probe since 2005.

BRIEF SUMMARY OF THE INVENTION

An aim of the present invention is to eliminate or mitigate some of those problems of the prior art in particular by providing an articulating probe head whose temperature is stabilized by cooling elements. The invention advantageously removes the heat generated by the operation of the articulating probe head instead of generating additional heat to stabilize its temperature at a higher value.

Another aim of the present invention is to provide an articulating probe head which does not require a "warm up" time to reach stable temperature for accurate measurements. The cooling elements maintain the temperature of the articulating probe head substantially at its initial value such that measurement operations can be started immediately and continue without temperature variations.

Another advantage of the present invention is to provide an economical means for cooling a measurement probe by connecting it via a good thermal conductor to the articulating probe head comprising cooling elements.

According to the invention, these aims are achieved by means of the appended claims.

Embodiments of the articulating probe head of the present invention can comprise one, two, three or more rotary axes. The probe head can be comprised of detachable elements, for example one probe head providing two orthogonal rotary axes and a second elongated probe head providing a single rotary axis for rotation around its longitudinal axis.

In the embodiments, the articulating probe head comprises cooling elements which are preferably Peltier elements which are attached to the casing of the probe head. For rectangular probe heads, 4 flat Peltier elements can be attached to the four outer sides by means of thermally conducting glue. For cylindrically shaped probe heads, curved Peltier elements can be attached to cover the casing. This arrangement assures uniform heat removal from all sides of the probe head. Other embodiments can be realized with only one Peltier element or two elements attached to opposite sides, however. The free surface of each Peltier element is preferably covered with a heat sink or a radiator, in good thermal contact with it, in order to radiate more efficiently the heat removed from the probe head. The at least one Peltier element or elements are powered by the probe head and their operation is controlled by the embedded micro controller or microprocessor in the probe head.

In another embodiment the cooling element consists of a closed circuit of liquid coolant connected to a heat sink or heat exchanger on the outer side of the of the probe head casing. The liquid coolant can be pumped such that the flow rate is changed as a function of the amount of heat to be removed.

In another embodiment the cooling element consist of an air-circulation system that injects compressed air into the inner volume of the probe head. The air is vented out from the side opposite to the air inlet in order to remove the heat from the inner volume. The airflow rate can be modified with a pressure regulator, a throttle valve, or a pump as a function of the amount of heat to be removed. This realization has the advantage that compressed air is readily available on most CMM's. However connecting the probe head to the compressed air source requires tubing which may not be practical to install and operate.

In a further embodiment the cooling element consists of one or several small fans installed on the outer sides of the probe head casing to blow air into the inner volume. Small piezoelectric fans operating at high frequency without any rotary parts have the advantage of not degrading the measurement accuracy by low frequency vibrations.

The cooling elements are preferably controlled by a control unit in the probe head, such as micro-controller or a micro-processor. The control unit is preferably embedded in the probe head, but, the invention also include variants where it is external. The control unit modifies the rate of cooling in such a way as to remove the heat generated during the operation of the probe head. The rate of cooling is calculated by the control unit based on a measurement of the heat generated inside the probe head. The heat generated can be monitored by one or both of two methods.

The first method of monitoring the heat generated in the probe head is based on a measurement of the total power consumption of the probe head. The power consumption of the probe head is measured by measuring separately the input voltage, generally 24 VDC, and the current drawn by means of analogue to digital converters (ADC). The voltage is measured directly while the current can be measured from the voltage drop across a series resistor. The multiplication of the two quantities yields the total power consumption which can be used to control the cooling elements in closed loop fashion.

The total power consumption is only a coarse measurement of the heat generated inside the probe head. In general the power consumption will have an approximately constant component and a variable component. The constant component is due to the power dissipation of the electronics, including the micro controller, encoders, power converters etc. and is directly proportional to the heat generated. The variable component is due to the one or several motors which operate intermittently and which dissipate power both in the form of heat and of motion. For a more accurate estimation of the heat generated in the probe head, the voltage and current supplied to the one or several motors should also be measured. In particular, for brushless motors and polyphase motors, an accurate estimation requires often the measure of voltages and currents of all the phases. The amount of heat generated is then calculated separately for the constant and variable sources and the sum can be used to control the cooling elements. While the instantaneous power consumption and the related heat is measured at frequent intervals, for example at 1 Hz, these measurements are averaged over an appropriate time interval, for example 1 minute, to avoid frequent and large modulations of cooling. The power consumption of the cooling element itself must also be included in the variable part of the power consumption.

Another possible method uses one or several thermometers to measure the temperature of the probe head at regular intervals during operation. The one or several thermometers are preferably placed inside the probe head. However, temperature sensors external to the probe head can also be used, such as thermal cameras installed on the CMM. The cooling elements are operated in closed loop fashion in response to the measured temperature such that the temperature of the probe head is kept substantially constant during operation.

The cooling elements of the probe head can also be used for other purposes besides stabilizing the temperature during operation. For example, they can be used to cool the probe head rapidly if its temperature is higher than the temperature of the CMM or of the environment in which the measurements are to be made. It may also be desirable in certain applications to cool the probe head to a lower temperature than the ambient one.

In another embodiment, the cooling elements of the probe head are used to cool an active probe that is connected to it. Optical probes, such as laser triangulation probes, can consume several watts that are dissipated in the air and in the probe head. To evacuate the heat into the probe head more efficiently, a heat conducting contact surface is provided between them, including the connecting screw. In the probe head the contact surface is connected to the cooling elements by means of elements of good heat conduction. As the power to the probe is normally supplied by the probe head, the power consumption of the probe can also be measured in the probe head. The control unit in the probe head increases the cooling rate proportionately to the power consumption of the probe.

BRIEF DESCRIPTION OF THE DRAWINGS

The invention will be better understood with the aid of the description of an embodiment given by way of example only and illustrated by the figures, in which.

In the drawings, elements designated with the same reference symbol indicate the same feature, or equivalent features.

DETAILED DESCRIPTION OF POSSIBLE EMBODIMENTS OF THE INVENTION

Figure 1:
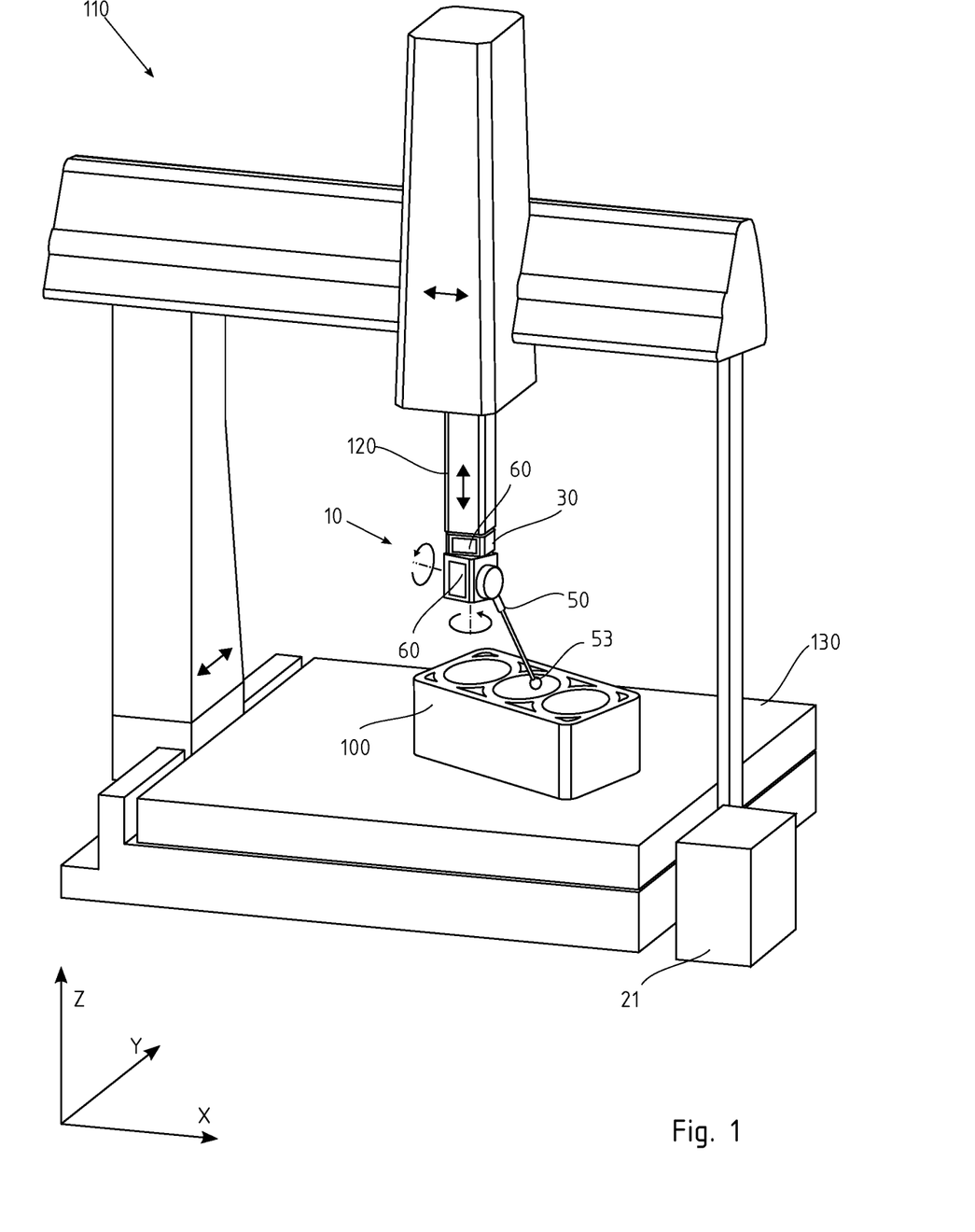
FIG. 1 illustrates an articulated probe head according to an aspect of the invention in a three-dimensional coordinate measuring machine. The head has cooling elements connected to an external cooling controller.

FIG. 1 illustrates a bridge-type coordinate measuring machine 110 with a positioning platform or quill 120 that can move according to three independent orthogonal axis, X, Y, Z. To the positioning platform 120 is attached an articulating probe head 10, which has two rotors in series, the first one arranged to rotate around a vertical (parallel to the 'Z' axis), and a second one, in series with the first, that rotates around an horizontal axis.

The second rotor of the probe head 10 has provisions to connect a coordinate probe. For example a touch-trigger probe, a touch scanning probe, or a contactless probe. FIG. 1 shows, by way of example, a touch-trigger probe 50. The probe can be oriented in whatever desired direction by the rotators of the probe head, and translated in the XYZ directions by the positioning platform 120. In this way, the probe can be brought into contact with a workpiece 100 that is placed on the reference plane 130 to measure its coordinates.

Figures 2, 3:
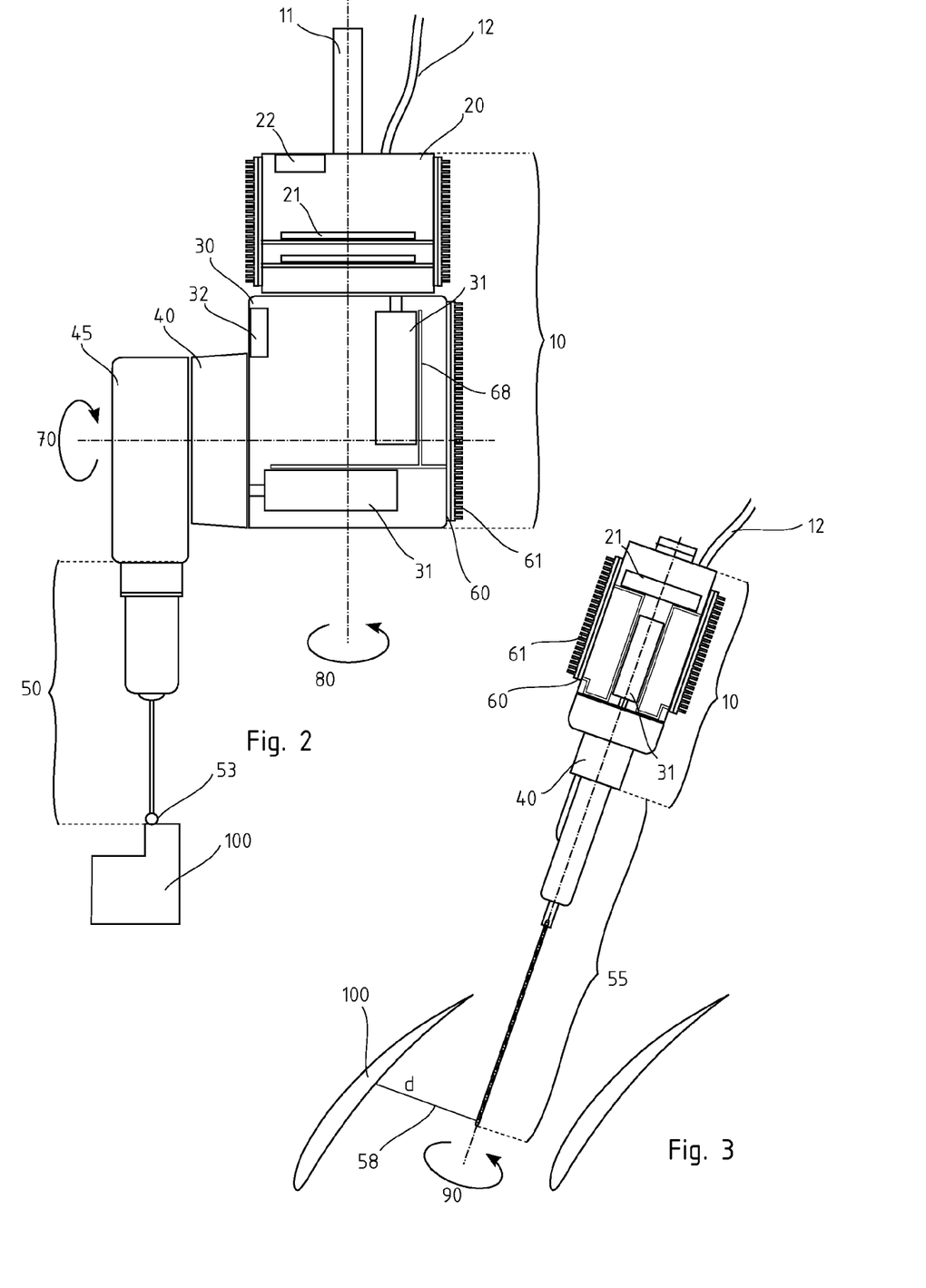
FIG. 2 shows an articulating probe head with 2 axes of rotation comprising cooling elements embodied as thermoelectric devices according to one aspect of the invention.
FIG. 3 illustrates an articulating probe head with 1 axis of rotation and comprising cooling elements according to one aspect the invention.

Importantly, the probe head 10 comprises cooling elements 60 which are fixed to the outer side of the casing. In a preferable embodiment the cooling elements 60 are, as shown in the figure, thermoelectric cooling elements, also referred to as Peltier coolers. Each Peltier cooler 60 is covered by a heat sink or radiator 61 in thermal contact with it (visible in FIG. 2), in order to accelerate the radiation of the heat. The size and shape of the heat sink is selected depending on the cooling power of the Peltier element. If a low cooling power is sufficient, the heat sink can be omitted. The number of Peltier coolers and their size can be selected as a function of the cooling requirements of the probe head 10. At least one cooling element is required by the invention. Preferably two cooling elements are placed on opposite sides of the probe head for more uniform heat dissipation. FIG. 2 shows two cooling elements on the stationary part 20 of the probe head and one element on the first rotary part 30. However more cooling elements can be added depending on the heating of the probe head. In addition, the use of several cooling elements assures a more uniform temperature distribution inside the probe head. Size, number and placement of the cooling elements can be optimized by suitable simulation software, for example.

The cooling units 60 that are used to stabilize its internal temperature, under the supervision of a heat-management controller 21 placed, in this example, external to the probe head. The management of the cooling power of the cooling units 60 by the controller will be explained in detail further on.

FIG. 2 illustrates, schematically, an articulating probe head 10 which is connectable to the quill of a CMM by means of a threaded rod 11, or by other connection means. As it is conventionally known, the quill of the coordinate measuring machine (not shown in the drawing) is operated to move along a given trajectory in space, while the probe head carries and orients a coordinate measuring probe.

The probe head 10 comprises a base 20 which is stationary with respect to the quill, a first rotary part 30 which is rotatable around the vertical axis 80, and a second rotary part 40 which is rotatable around the horizontal axis 70. An adapter element 45 attached to the rotary part 40 provides a probe interface to which a measuring probe 50 is connected.

FIG. 2 shows, to present an example, a touch-trigger probe, which detects the contact between a workpiece 100 and a precise spherical tip 53. The probe 50, however, can be of contact or non-contact type and operate either in touch-trigger or continuous scanning mode.

The stationary part 20 comprises an electronic control unit 21 including a micro controller or microprocessor with memory to control the operation of the probe head. The control unit 21 is capable of communicating with an external device, such as the controller of the CMM, for example by means of a cable 12.

The first rotary part 30 comprises two actuators 31 which rotate the first and second rotary parts around the two axes 70 and 80. The actuator can be electric motors, piezoelectric devices or other electromechanical elements. The probe head could include in addition, angle encoders, locking and unlocking mechanisms, etc. as required, which are not shown in the figure for the sake of clarity. A more detailed embodiment of an articulating probe head with 2 axes of rotation is presented elsewhere, for example in US20150176958. The invention can be applied to indexed probe heads that can orient their rotors according to a finite number of angles, as well as continuous-rotation ones.

The generation of internal heat in the probe head is mainly in the electronic control unit 21 and in the actuators 31, although encoders and other elements can also contribute. Often, the metallic body of the probe will provide an adequate thermal path between the heat sources and the cooling elements 60. It may be desirable, in some situations, to add purposefully thermal links 68 between the heat sources and the cooling elements, to lower the thermal gradients inside the probe. The thermal links are represented schematically by double lines 68 in the drawings and could be realized by metallic elements, heat pipes, or other heat-transfer means.

Advantageously, a thermal link having a heat conduction equal or greater that those of the probe head body can be operationally placed between a heat source of the probe head so as to lower the thermal gradients inside the probe head 10.

A thermal link having a heat conduction equal or greater that those of the stationary part or of the probe head body can thus be operationally placed between the control unit 21 and the cooling element 60 so as to lower the thermal gradients inside the stationary part 20.

A thermal links having a heat conduction equal or greater that those of the rotor 30 can be operationally placed between an electrical actuators 31 of the rotor 30 and the cooling element 60 so as to lower the thermal gradients inside the rotors 30.

In the preferred embodiment shown, the Peltier coolers are activated by applying a voltage VC(t) as a function of time, t, whose amplitude determines the cooling power. The voltage can be generated, for example, by a digital-to-analog converter (DAC) which is controlled by the embedded micro controller. The cooling power is varied as a function of the heat generated in the probe head during operation in order to maintain the probe head at its initial temperature.

In the normal operation of a probe head, part of the heat generated inside is radiated out into the surrounding air and the remainder is absorbed by the mechanical parts of the probe head, thereby raising their temperature. In continuous operation the probe head temperature will continue to rise until it reaches a stable value. As the probe head temperature increases, its metallic body will dilate and change the calibrated position of the probe tip 53. The resulting error in the CMM coordinate measurements can be approximately 1 micrometer for each degree C. rise in temperature for a steel probe head of approximately 10 cm length. To avoid such an error, the probe must be calibrated frequently during the period when the temperature of the probe head is not stable. This operation disrupts and slows down the measuring operations. After reaching a stable value, the probe head temperature may start to decrease if the motors in the probe head are not operated for a length of time. Such temperature variations require additional calibration to assure accuracy of measurements.

A solution proposed in previous devices as discussed above is to heat up rapidly the probe head to a preset value and to maintain it there by supplying more heat as needed. This solution introduces an initial warm up time during which measurements cannot be made, thereby slowing down measuring operations. In addition, the heated probe head causes the CMM quill and the measuring probe with which it is in contact to warm up. Frequent calibrations are required to insure that this uncontrolled heating does not affect the measurement accuracy.

Advantageously, the preferred embodiment of the present invention comprising cooling elements will maintain the initial temperature of the probe head, removing the need for a warm up time and of additional calibrations. It will thereby speed up the measurement operations and avoid heating up the quill and the probe which are attached to the probe head.

In order to maintain the temperature of the probe head at its initial value the one or several cooling elements must be controlled such that the cooling power they provide is able to remove the heat generated in the probe head. Two methods will be described to implement this control, which can be used separately or concurrently.

In the first method, as shown in the preferred embodiment of FIG. 2, the heat generated in the probe head is estimated by monitoring the power consumption of the probe head. Preferably, the power consumption is measured directly by monitoring the current and the voltage on the lines which power various components of the probe head. Typically, one part of the consumed power is constant in time and is due to the embedded micro controller, encoders and other electronics. Another part of the power consumption is variable, due to the operation of the motors. Depending on the measurement program, the probe head may be moving rapidly or it may be completely still while the probe is positioned by the motion of the CMM. The power consumption is calculated by the embedded micro controller in real time by multiplying the measured current and voltage values periodically, for example at 1 Hz rate.

The electrical power consumed by the probe head, PT(t), is the sum of the power consumed by the subsystems in the probe head:

$$PT(t)=PM(t)+PE(t)+PCE(t)$$

where PM(t) is the power consumption of the rotary motors, PE(t) is due to the electronics and PCE(t) due to the cooling element, all expressed as a function of time, t. All three subsystems dissipate part of the consumed power as heat. For the electronics essentially all of the power consumed is dissipated as heat while for the motors and the cooling element only a fraction of the total power is converted to heat. Part of the generated heat is radiated out of the probe head into the surrounding air and part of it absorbed by the mechanical structure of the probe head which heats up as a consequence.

The cooling elements are activated to accelerate the radiation of the generated heat so that the temperature of the probe head remains stable during operation. The cooling power, PC(t), which is needed to remove the heat can be determined either in a coarse or a fine manner.

A coarse determination of the cooling power required for different values of PT(t) is made empirically, by a series of measurements on a sample probe head with a variety of motions and with different mechanical loads. For each measurement sequence the cooling power needed to maintain the probe head at its initial temperature is determined by varying the cooling power while monitoring the probe head temperature. The resulting data is averaged to parametrize the cooling power needed as a fraction, f, of the electrical power consumption:

$$PC(t)=f(PT(t))*PT(t)$$

Generally, f is not constant but depends on the total power consumption. The value of f as a function of PT(t) is stored in the memory of the embedded micro controller and is used in all subsequent operations to apply the appropriate cooling power as a function of the total power consumption. The cooling power PC(t) applies to all of the cooling elements combined. It is of course feasible to differentiate the cooling power of different elements in order to achieve a more uniform temperature distribution.

Advantageously, PT(t) is measured at frequent time intervals, for example at 1 Hz rate, in order to track the intermittent operation of the motors. However, to avoid rapid fluctuations in cooling, these measurements can be averaged over a longer time period, for example 1 minute, and the cooling power modified at that rate. Other values of the sampling frequency and the averaging period are of course possible and the embedded micro controller can be programmed accordingly.

A finer determination of the cooling power can be made by measuring separately the power consumption of the 3 subsystems. Power to each subsystem is generally supplied on individual lines and the voltage and current on each line can be measured by ADC's and multiplied in the micro controller to calculate the power consumption in real time. If brushless motors are used, then all 3 lines must be monitored for each motor.

The fraction of the power consumed that is transformed to heat is determined for each subsystem by calculation or empirically and stored in the micro controller. The cooling power is then calculated from:

$$PC(t)=fC[fM*PM(t)+fE*PE(t)+fCE*PCE(t)]$$

Where fM, fE, fCE are the fractions of consumed power that are converted to heat for the motors, electronics and the cooling elements respectively. The constant term fC is determined on a sample probe head in a test setup, as described above, such that the temperature of the probe head remains stable in various test sequences.

The coefficients fM, fE, fCE and fC are constant terms in the preferred embodiment. However, it may be desirable to introduce a time dependence for these terms at least during the start of operations for a smoother approach to thermal equilibrium. The time dependence can be determined from simulations or from measurements on a sample probe head.

For brushless motors fM depends on the operational mode of the motor. If the 3 phases are such that the motor is supplying maximum torque, a certain fraction of the power consumed will be converted to heat. If, on the other hand, the phases are such that the motor is actively maintained in a fixed position, then essentially all of the power consumed will be transformed to heat. These different operational states can easily be recognized by the embedded micro controller which monitors the power, and it is programmed to change fM accordingly.

The second method for controlling the cooling power relies on a measurement of the temperature of the probe head. The embodiment shown in FIG. 2 comprises temperature sensors 22 and 32 placed inside the stationary part 20 and the first rotary unit 30 respectively. For illustration, they are shown attached to the inner surface of the casing, however other locations are also possible. Each temperature sensor can be one of a thermistor, a digital thermometer, an infrared sensor or another temperature sensitive device. The number of temperature sensors can be increased to improve the accuracy of the temperature measurement. The readout of the temperature sensors is done by the embedded micro controller through appropriate interfaces and at frequent intervals, for example at 1 Hz. The temperature readings are averaged by the micro controller over all the sensors and over a predetermined lapse of time, for example 1 minute. The micro controller varies the cooling power PC(t) in a closed loop control to maintain the mean temperature TM(t) substantially equal to the initial temperature at the start of operations.

In another embodiment a remote temperature sensor placed outside the volume of the probe head can be used. An infrared sensor, for example, can be fixed to the CMM frame to monitor the temperature of the probe head.

FIG. 3 shows a different embodiment of the invention for a probe head with a single rotary axis 90. Features with the same reference number than in FIG. 2 represent the same or functionally equivalent elements.

The head is represented in combination with a contactless probe 55 that measures the distances d along a laser beam 58 to the workpiece 100. Even if it is not represented in the figure, the probe head of FIG. 3 could be mounted on a 2-axis probe head, like for example that of FIG. 2, to yield a 3-axis combination, especially suitable for scanning the surface of complex workpieces, for example airfoils, and for reaching hidden surfaces. The probe head can, however, be combined with any kind of coordinate probe and positioning platform.

The cooling elements 61 are, preferably, Peltier coolers, and are adapted to the cylindrical shape of the probe head and attached to the outer side of the casing symmetrically.

The cooling elements comprised in the probe head of the present invention can be used to cool additionally a measuring probe that is connected to the probe head. Laser probes or probes comprising opto-electronic circuits consume power and generally need to warm up to a stable temperature before accurate measurements. When connected to a probe head according to one of the embodiments of this invention, such measuring probes can be connected to the cooling element of the probe head and be cooled at least partially. For this purpose good thermal contact needs to be assured between the measuring probe and the probe head casing to which the cooling elements are attached. If necessary, heat transfer elements 68 can be foreseen to reduce the thermal resistance between control unit 21, actuator 31, and rotor 40, Preferably, the micro controller 21 includes thermal models of the probe head and of the coordinate measuring probe that can be connected to it. The thermal models can model heat generation inside the probes and inside the probe head, as well as thermal conductions inside and between the probes and the probe head. The control unit 21 is programmed to select the appropriate thermal model for the probe 55 that is connected at each moment, and adapt the cooling power PC(t) accordingly.

Figure 4:
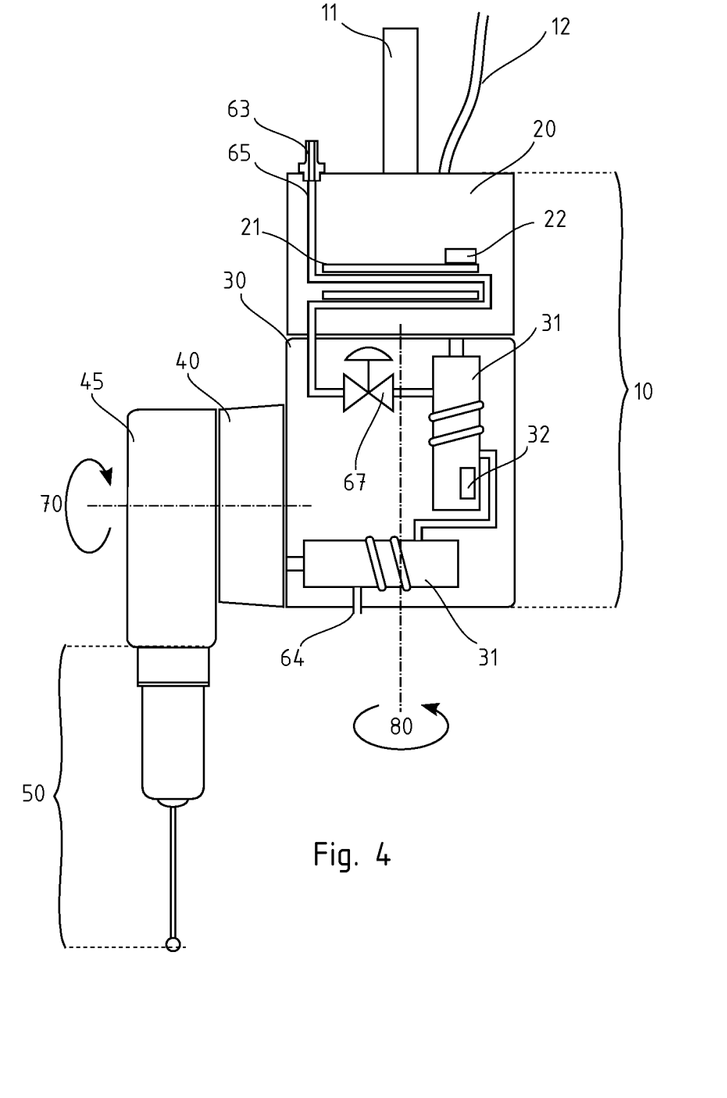
FIG. 4 illustrates schematically a variant of the invention in which the cooling elements are embodied as a fluid-circulation system.

FIG. 4 illustrates another variant of the invention in which the cooling elements are embodied as a fluid-circulation system. CMM machines are often equipped with compressed air circuits and, in this case, cooling can be achieved by controlling the circulation of air in a "total loss" path. As illustrated in the drawing, an air conduit 65 passes close to the control unit 21 and the actuators 31. It is connectable to a pneumatic source by a suitable connector 63 and vents the used air by an exit port 64. A valve 67 allows setting the airflow and is controlled by the control unit 21 similarly as it was the case for the thermoelectric element of the previous embodiment.

Advantageously, a thermal link or element can be operationally placed between a heat source of the probe head (notably the control unit 21 and/or a rotor 31) and the cooling element (i.e. air conduit 65) for improving the heat conduction from the heat source to the cooling element so as to further reduce the thermal gradients inside the probe head.

It must be understood that the disposition of FIG. 4 is a conceptual example that does not represent all the details of a concrete realization. What details are omitted, however, could be provided by a person provided of ordinary skills and knowledge in the art. The invention could then include variants with several control valves, more elaborate fluid paths, and slipping joints to allow fluid passage from the fixed part 20 to the rotor 30. Incidentally, FIG. 4 represents also an alternative position for the thermal sensors 22, 32 that are located closer to the heat sources, namely to the control unit 21 and to an actuator 31. In other variants, the control valve could be not in the probe head, but upstream in the coordinate measuring machine, and be controlled remotely by the control unit 21.

Advantageously, the thermal sensor 22 is located in thermal contact with the control unit 21 for measuring a temperature permitting to estimate the heat dissipated inside the stationary part 20, i.e. inside the probe head 10, by the control unit 21.

Advantageously, the thermal sensor 32 is located in thermal contact with the first rotor 30 (e.g. in thermal contact with one or more electrical actuators 31 of the first rotor 30) for measuring a temperature so as to estimate the heat dissipated inside the first rotor 30, i.e. inside the probe head 10, by the inside-located actuators 31.

According to another variant, not represented, the cooling element could be realized by a closed circulation of fluid, in which the vent 64 of FIG. 4 would be replaced by a return connector. In this case liquids could be used, for higher heat transfer.

In a further variant, the probe head could include means to generate an air or fluid flow, for example fans or blowers, that are driven by suitable electric motor, for example of induction or if piezoelectric type, controlled by the control unit 21.

Variants that imply fluid transport could, particularly if they comprise also fans and blowers, generate vibrations that might affect negatively the precision. In such cases the control unit could be programmed to suspend the cooling action when measures are taken, and resume it in intervals between the measurements.

According to another variant the cooling power is controlled by an external controller 21, as shown in FIG. 1, to which the articulating probe head is connected via the cable 12. In this variant the embedded microcontroller in the probe head communicates the temperature and/or power consumption measurements to the external controller and receives in return the cooling power PC(t) to be applied to the cooling elements.

REFERENCE NUMBERS d distance
10 articulating head
11 Threaded rod
12 Cable
20 Support
21 control unit
22 temperature sensor
30 first rotor
31 Actuator
32 temperature sensor
40 second rotor
45 Adapter
50 measuring probe
53 probe's tip
55 contactless probe
58 Distance
60 cooling unit
61 radiator, heat sink
63 Connector
64 Port
65 Conduit
67 Valve
68 thermal link
70 first axis
80 second axis
90 rotary axis
100 Workpiece
110 coordinate measuring machine
120 positioning platform, quill
130 reference plane

We claim:

1. An articulating probe head for attaching and orienting a probe relative to a coordinate measuring apparatus, including:
    at least one electric actuator operating on the probe head;
    one electronic control unit embedded in the probe head, comprising a microcontroller or a microcomputer controlling the operation of the probe head; and
    at least one cooling element, in which the electronic control unit is operatively arranged to modify a cooling power of the cooling element dependent from the heat generated in the probe head during operation to maintain the temperature of the probe head at a stable value, wherein the electronic control unit is arranged to deactivate the at least one cooling element during measure operations.

2. The articulating probe head of claim 1, wherein the actuator acts on a rotatable element to whom a coordinate probe is attached, for orienting the coordinate probe.

3. The articulating probe head of claim 1, wherein at least one cooling element is a thermoelectric Peltier cooler.

4. The articulating probe head of claim 1, wherein the at least one cooling element includes a circulating fluid, liquid, vapor, or gas, and a heat exchanger.

5. The articulating probe head of claim 1, wherein the electronic control unit is operatively arranged to measure the electric power absorbed by the probe head and to regulate the cooling power of the cooling element dependent from the measured absorbed electric power.

6. The articulating probe head of claim 1, wherein the electronic control unit is operatively arranged to measure separately the individual levels of electrical power absorbed by the at least one motor, by the electronic control unit itself, and of the cooling element, and to regulate the cooling power of the cooling element in a manner dependent from the individual levels of electric power.

7. The articulating head of clam 1, comprising at least one temperature sensor, for example a thermistor, a calibrated metal temperature sensor, a temperature-variable voltage or current source, or a digital thermometer.

8. The articulating probe head of claim 7, comprising a plurality of temperature sensors inside the probe head.

9. The articulating probe head of claim 7, wherein the electronic control unit is arranged to regulate the cooling power of the cooling element depending from the temperature measured by the at least one temperature sensor.

10. The articulating probe head of claim 1, wherein the electronic control unit is arranged to cool the probe head below its initial temperature.

11. The articulating probe head of claim 1, comprising a plurality of cooling elements symmetrically arranged.

12. The articulating probe head of claim 1, wherein the at least one cooling element is operated in closed loop fashion in response to the temperature such that the temperature of the probe head is kept constant.

13. An articulating probe head for attaching and orienting a probe relative to a coordinate measuring apparatus, including
    at least one electric actuator operating on the probe head;
    one electronic control unit controlling the operation of the probe head, and
    at least one cooling element, in which the electronic control unit is operatively arranged to activate the at least one cooling maintain the temperature of the probe head at a stable value,
    wherein the electronic control unit is arrange to deactivate the at least one cooling element during measure operations.

* * * * *